(12) United States Patent
Danoyan

(10) Patent No.: US 8,694,471 B2
(45) Date of Patent: Apr. 8, 2014

(54) SYSTEM AND METHOD FOR UPDATING A CACHE USING A GATING MECHANISM AND EVENTS

(75) Inventor: Alexander Y. Danoyan, Riverton, UT (US)

(73) Assignee: Oracle International Corporation, Redwood City, CA (US)

( * ) Notice: Subject to any disclaimer, the term of this patent is extended or adjusted under 35 U.S.C. 154(b) by 1618 days.

(21) Appl. No.: 11/463,493

(22) Filed: Aug. 9, 2006

(65) Prior Publication Data

US 2008/0040395 A1    Feb. 14, 2008

(51) Int. Cl.
*G06F 17/30* (2006.01)
(52) U.S. Cl.
USPC .......................................... 707/655; 707/637
(58) Field of Classification Search
USPC ................. 707/202, 104, 637, 655; 341/50
See application file for complete search history.

(56) References Cited

U.S. PATENT DOCUMENTS

| 6,275,819 B1 | 8/2001 | Carter |
| 6,654,766 B1 * | 11/2003 | Degenaro et al. .......... 707/104.1 |
| 2007/0115151 A1 * | 5/2007 | Singh ............................ 341/50 |
| 2008/0147657 A1 * | 6/2008 | Vora et al. ....................... 707/6 |

OTHER PUBLICATIONS

NetPro, "DS Expert Technical Article—#1001", http://www.netpro.com/support/dsexpert/dseta1001.cfm, date unknown, downloaded Apr. 18, 2006, 2 pages.
NetVision, "How NSAF Works", http://netvision.com/products/nvaudit.html, last modified on Mar. 15, 2006, 2 pages.

* cited by examiner

*Primary Examiner* — Shahid Alam
(74) *Attorney, Agent, or Firm* — Marger Johnson & McCollom PC

(57) ABSTRACT

A client caches objects from a data set on a server. The client registers to receive notification of events that occur to cached objects. As events occur to cached objects, the client determines if a specified time interval has elapsed since the cached objects were last updated. If a specified time interval has elapsed, then the client updates the cached objects. If a specified time interval has not elapsed, then the client waits for the specified time to elapse, during which time additional updates to the objects on the server can occur.

17 Claims, 7 Drawing Sheets

SYSTEM AND METHOD FOR UPDATING A CACHE USING A GATING MECHANISM AND EVENTS

FIELD OF THE INVENTION

The invention pertains to creating a cache of server data on a client, and more particularly to updating the cache if the data changes in a specified time interval.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

In large scale, distributed, client/server applications, the server can service hundreds, if not thousands, of simultaneous requests from various clients. In many of these applications, the servers use the lightweight directory access protocol (LDAP) enabled. LDAP is a protocol that has been developed to query and modify directory services running over the Internet.

Client/server applications use LDAP to get authentication and authorization from a separate identity management system using the LDAP protocol. For example, the separate identity management system could be a single LDAP directory or several LDAP directories stored on an OpenLDAP, eDirectory, or Active Directory server.

In an LDAP environment, there is a server hosting a client/server application, and an LDAP server storing a data set used by the client/server application. The server hosting the application is considered an LDAP client, usually authenticating as a proxy and retrieving various details about its clients identities and their authorization permissions.

The LDAP client applications can be very aggressive, and can generate significant load to a LDAP server and create high utilization on that server. One way to avoid this burden on the server is to cache a subset of LDAP server data on the client. By caching a subset of LDAP server data, the LDAP client does not need to contact the LDAP server every time the data is referenced. Where there are several LDAP client applications, reducing the number of times a client application queries the LDAP server improves the time spent responding to the queries.

For example, as a client logs into an application using a user name and password, the LDAP client can submit the user name and password to the LDAP server for authentication. Then, if the authentication succeeds, the LDAP client can cache the user name and password to be used the next time the client logs into the application.

However, caching a subset of LDAP server data on the client introduces other problems. For example, data in the cache can become stale. A user name and password combination can be changed in the data set on the LDAP server after being cached on the LDAP client. In situations where security is especially important, stale cache of LDAP server data is unacceptable.

Accordingly, a need exists to update cache on a LDAP client to minimize the load to the LDAP server as changes are made to the data on the LDAP, frequently enough to limit the problem of stale data on the LDAP client.

SUMMARY OF THE INVENTION

An LDAP client caches objects from a data set in an LDAP server. The LDAP client registers to receive notification of events that occur to cached objects. As events occur to cached objects, the LDAP client determines if a specified time interval has elapsed since updating the cached objects. If a specified time interval has elapsed, then the LDAP client updates the cached objects. If a specified time interval has not elapsed, then the LDAP client waits for the specified time to elapse, while allowing additional updates to the objects on the LDAP server.

The foregoing and other features, objects, and advantages of the invention will become more readily apparent from the following detailed description, which proceeds with reference to the accompanying drawings.

BRIEF DESCRIPTION OF THE DRAWINGS

FIG. 3 shows the persistent search module of FIG. 1 including a register identifying registered clients with the objects the clients are interested in receiving events for.

DETAILED DESCRIPTION OF THE PREFERRED EMBODIMENT

Figure 1:
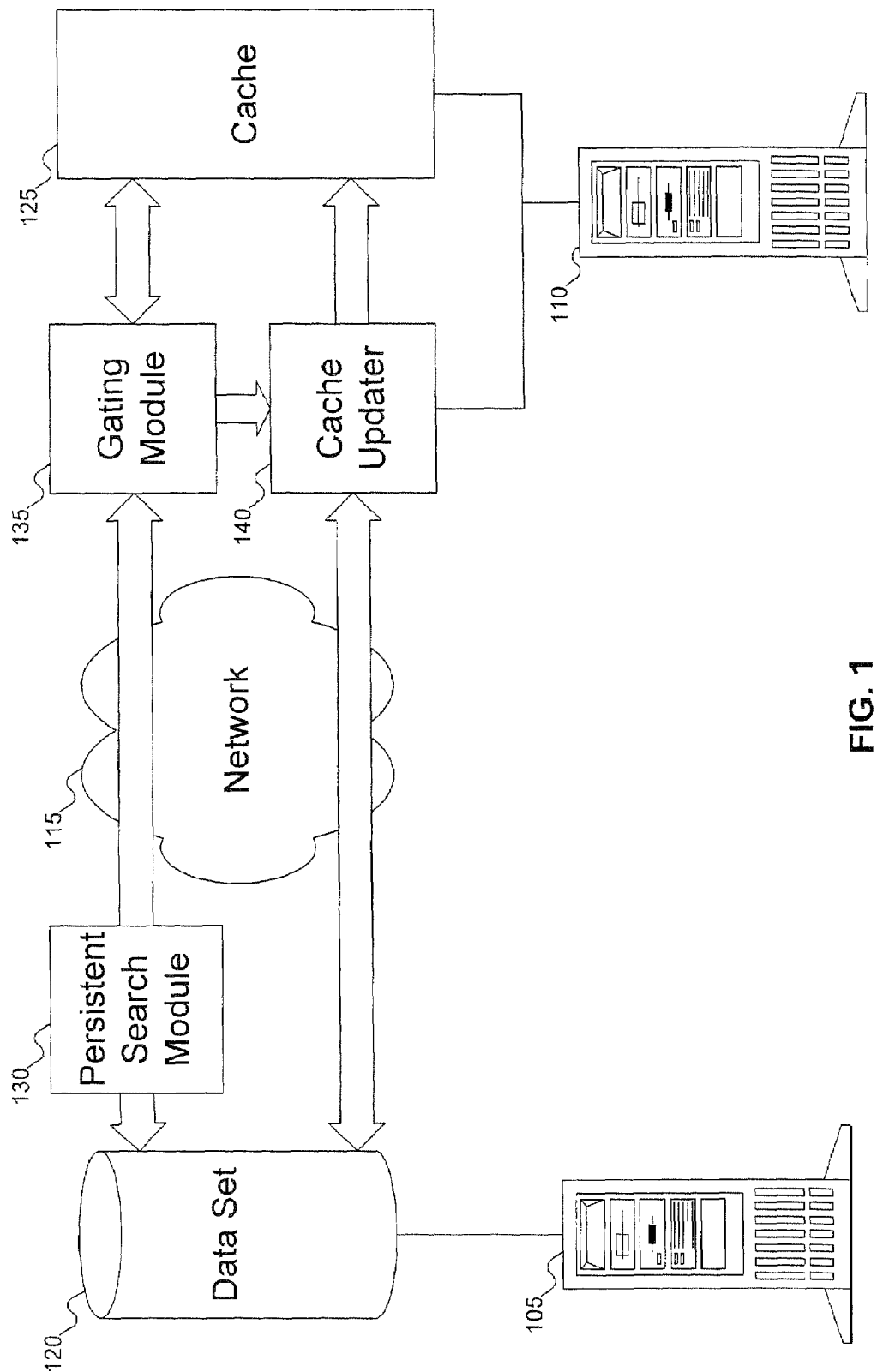
FIG. 1 shows a computer system with a data set on a server, a cache of the data set on a client computer, and a gating module to update the local cache, according to an embodiment of the invention.

FIG. 1 shows a computer system with a data set on an LDAP servers a cache of the data set on an LDAP client, and a gating module to control updates to the local cache, according to an embodiment of the invention. LDAP server 105 and LDAP client 110 are connected via network 115 and can be a server, computer, laptop, personal digital assistant, or other portable device. LDAP server 105 and LDAP client 110 typical elements of a computer, such as a central processor, memory, bus, disk space, etc.

LDAP server 105 includes data set 120. Data set 120 includes data that is used by LDAP client applications. For example, data set 120 can include directory information including user names and passwords of users authorized to use an application on an LDAP client. A person skilled in the art will recognize that if there are several client applications that use data set 120, keeping data set 120 on LDAP server 105 ensures that each client application uses the same directory information. Note that descriptions of the embodiments by reference to LDAP are illustrative; the invention can be used with other data set implementations.

LDAP client 110 includes cache 125 to store objects from data set 120 on LDAP client 110. By storing objects from data set 120 in cache 125, LDAP client 110 does not need to access data set 120 on LDAP server 105 each time the application on LDAP client 110 uses data. While cache 125 can reduce the load on the LDAP server 105, if objects in data set 120 change, cache 125 might store data that is stale, and the client application using the cached data might return incorrect results as a consequence.

In order to address the concern of stale data in cache 125, persistent search module 130 on LDAP server 105 is used to notify gating module 135 on LDAP client 110 when objects that are stored in cache 125 are changed in data set 120. Then, cache updater 140 can query data set 120 and update those objects stored in cache 125.

Of course, cache updater 140 could update cache 125 whenever an object in data set 120 is updated. But if cache updater 140 is used every time a cached object changes, then the benefit of cache 125 in reducing the load on LDAP server 105 is lost: data set 120 needs to be queried in order to update cache 125 imposing a different burden on LDAP server 105. And if there are several LDAP clients, then each client would be querying data set 120 at the same time in order to update the respective caches, thus increasing the load on LDAP server 105.

In an embodiment of the invention, gating module 135 can specify a time interval before cache updater 140 attempts to update any objects in cache 125. By specifying a time interval, a balance is struck between the concern of stale data in cache 125 and managing the load on LDAP server 105.

In an embodiment of the invention, the specified time interval can be five seconds. In this embodiment, gating module 135 updates cache 125 every five seconds, provided that an object stored in data set 120 has changed since the previous five second time point. In another embodiment of the invention, the specified time interval can be ten seconds. In yet another embodiment, the specified time interval can be any amount of time. A shorter amount of time can be selected that will favor more frequent updates that will decrease the likelihood of stale cache. In contrast, the time interval can be increased if it is stale cache is not a major concern.

Figure 2:
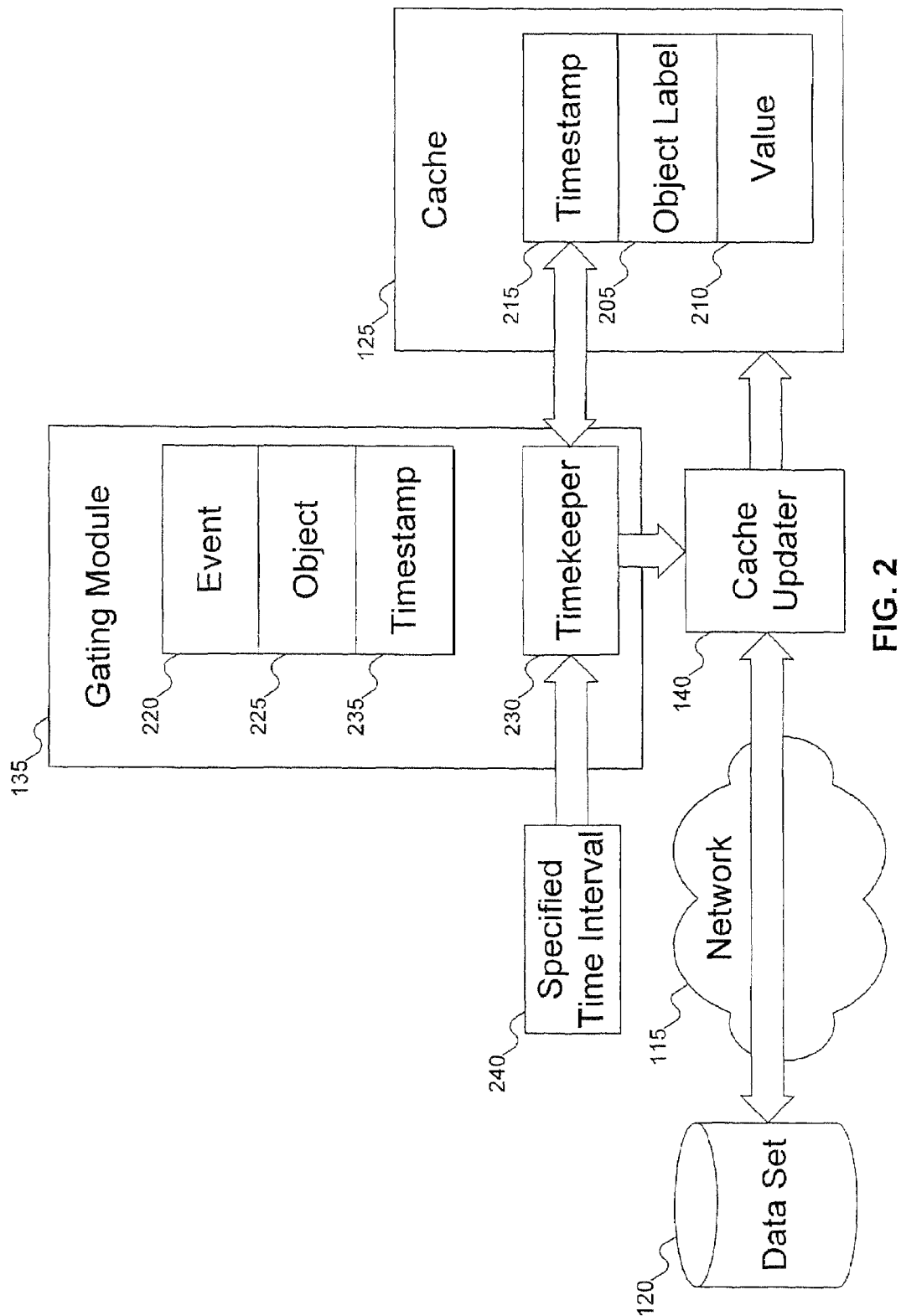
FIG. 2 shows details of the gating module of FIG. 1 along with a cache updater to update the local cache.

FIG. 2 shows details of the gating module, cache updater, and cache of FIG. 1 using a specified time interval. As previously discussed, cache updater 140 is used to query data set 120 in order to update an object stored in cache 125. In FIG. 2, cache 125 is shown with cached object information including object label 205, value 210 and timestamp 215. Object label 205 identifies the object, both in cache 125 and data set 120. Value 210 stores the value of the object. For example, if the object in cache 125 is a user object, then object label 210 might be "user name" and value 210 might be "User 1". Finally, cache 125 includes timestamp 215 that refers to the time that cache 125 was last updated. In another embodiment of the invention, each object in cache 125 can have its own timestamp associated with it when the object is last updated.

In an embodiment of the invention, as the LDAP client application accesses an object in data set 120, that object is stored in cache 125. The LDAP client application can access and use more than one object, and thus storing each of these objects in cache 125. Although FIG. 2 shows just one object stored in cache 125, cache 125 can in fact include any number of objects from data set 120. In addition, gating module 135 can be used to control the update of objects in cache 125 so that all objects that have been modified in data set 120 are updated at the same time.

Gating module 135 is shown including event 220, describing an event that has happened to object 225. In addition, gating module 135 includes timekeeper 230 that can compare timestamp 235 of event 220 to timestamp 215 that is associated with cache 125. On receipt of event 220, if timekeeper 230 determines that specified time interval 240 has elapsed since cache 125 has been updated, then gating module 135 notifies cache updater 140. Cache updater 140 can then query data set 120 to get the updated value of the object and update the object in cache 125 accordingly.

Figure 3:
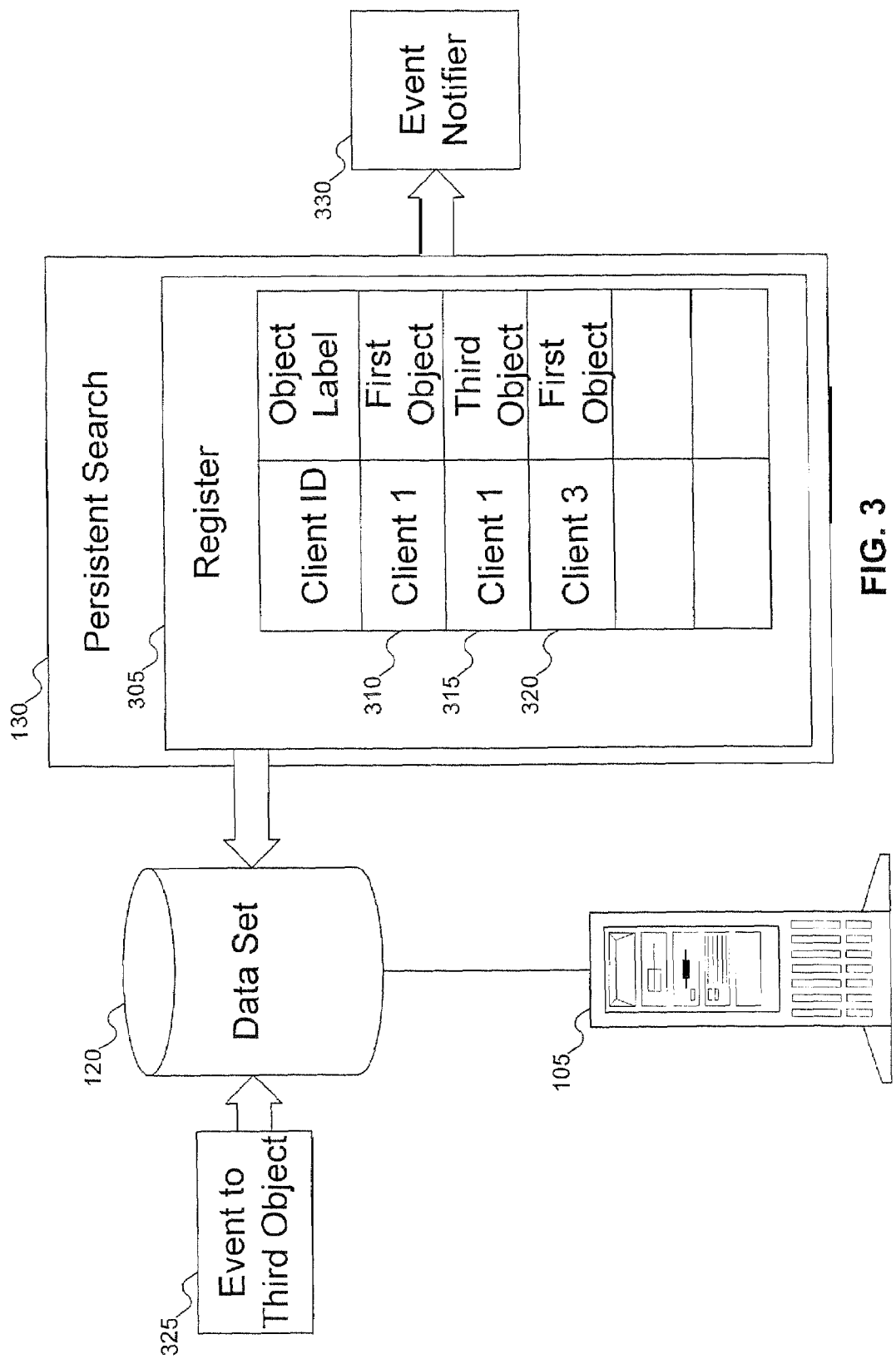

FIG. 3 shows the persistent search module of FIG. 1 including register 305, which identifies registered clients and the objects the clients are interested in receiving event notification. Register 305 includes three entries, although a person skilled in the art will recognize that register 305 can store any number of entries. Entry 310 shows client 1 registered to receive notification of events occurring to the first object. Entry 315 shows client 1 also registered for events occurring to the third object. Entry 320 shows client 3 being registered for events occurring to the first object.

As event 325 occurs to the third object in data set 120, persistent search module 130 looks in register 305 to see what clients, if any, need to be notified of event 325. Because entry 315 includes registration entry 315 for the third object, persistent search module 130 can notify client 1 about event 325 using event notifier 330.

Figure 4:
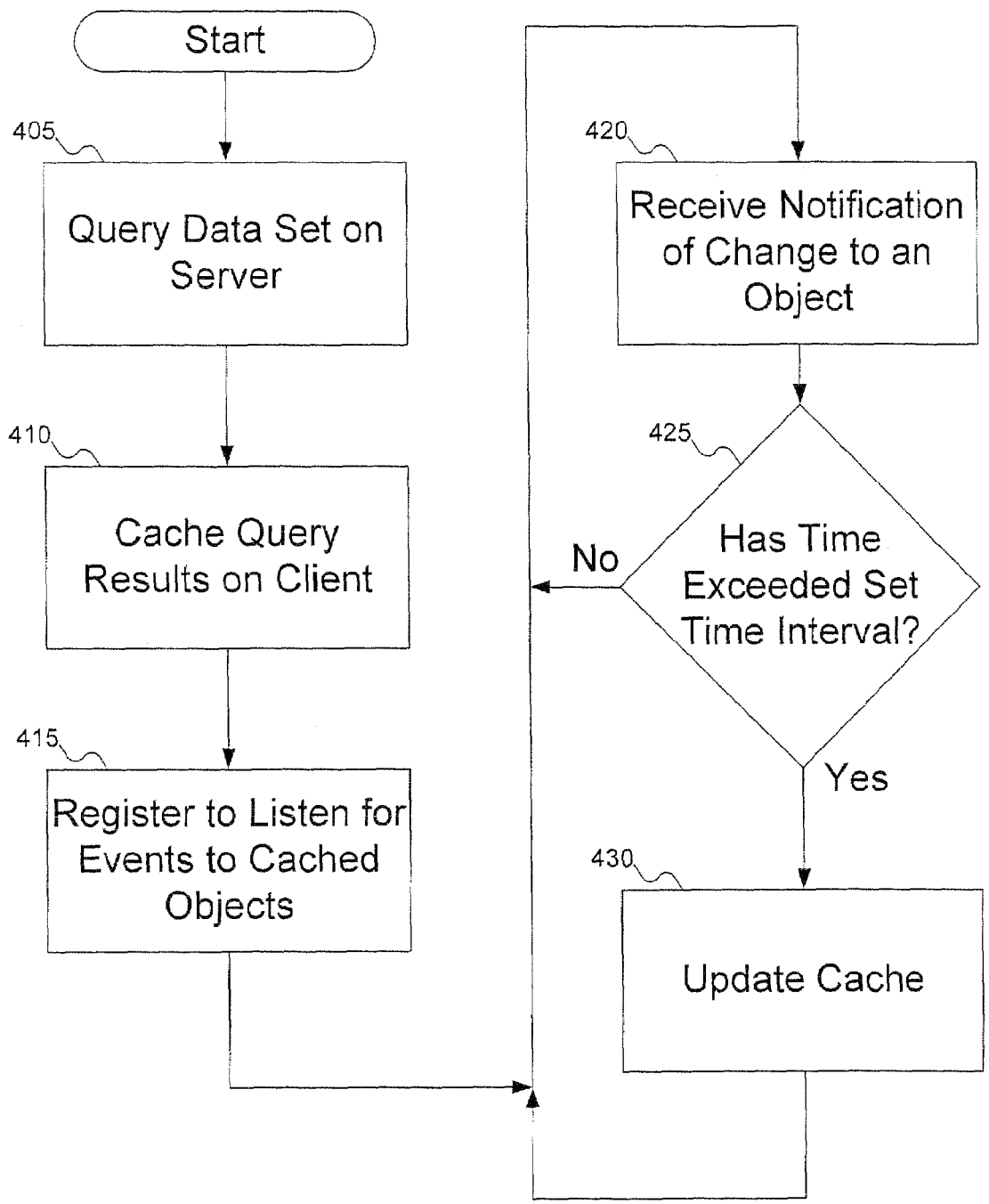
FIG. 4 shows a flowchart overview of the process to implement the cache update, according to an embodiment of the invention.

FIG. 4 shows a flowchart overview of the process to implement the cache update, according to an embodiment of the invention. At step 405, the LDAP client queries a data set on the LDAP server. The query will request the data values for objects in the data set that satisfy the query. For example, the query can request a password for a particular user name, or can check to see if a particular user name and password combination is a valid combination. At step 410, the query results are cached on the LDAP client. By caching the results of the query, the next time the LDAP client needs this information, the information can be found locally, and the LDAP client can avoid querying the LDAP server a second time.

At step 415, the LDAP client registers to listen for events involving objects in the data set. The persistent search feature of the LDAP server enables the LDAP client to receive notification when changes are made to registered objects. Until the persistent search feature notifies the LDAP client of a change to a registered object, the LDAP client can assume that the cached data is a correct representation of the object as stored in the LDAP server.

At step 420, the LDAP client receives notification of a change to a registered object. This means that some of the data in the cache is now stale, and the cache does not store the values of objects as stored on the LDAP server. However, the problem of a stale cache is only a problem if the LDAP client needs to use the cached data in execution of the client application. If the LDAP client does not need to use the cached object right away, then the cache can wait to be updated after a particular time interval in order to reduce the load on the LDAP server.

If the LDAP client needs to access the cached data before it has been updated to reflect modifications of the LDAP server, in one embodiment the LDAP client can query the LDAP server for the update to the object. This embodiment can be used when it is essential that the LDAP client uses the correct data. In another embodiment, the LDAP client can use the stale data without incurring a negative consequence. For example, if data is being accessed, but not used for calculations, then the cached data could be accessed, and then refreshed after the cache update occurs.

Recall that one of the reasons to cache objects on the LDAP client is to reduce the number of times the LDAP client accesses the LDAP server. If the LDAP client updated the objects in the cache every time an object is changed, the load on the LDAP server might be very high. By waiting for a time interval to pass, this load can be reduced. For example, the time interval could be set to be somewhere between five and ten seconds, although any desired interval can be used.

At decision block 425, if after receiving notification of a change to a cached object, the set time interval has not elapsed, the flowchart can wait for notification of another change to a cached object. When, at step 420, there is another notification of a change to a cached object, decision block 425 again checks to see if the set time interval has elapsed. If the set time interval has elapsed, then at step 430, the objects in the cache are updated to reflect the changes made to the objects on the LDAP server.

Figure 5A:
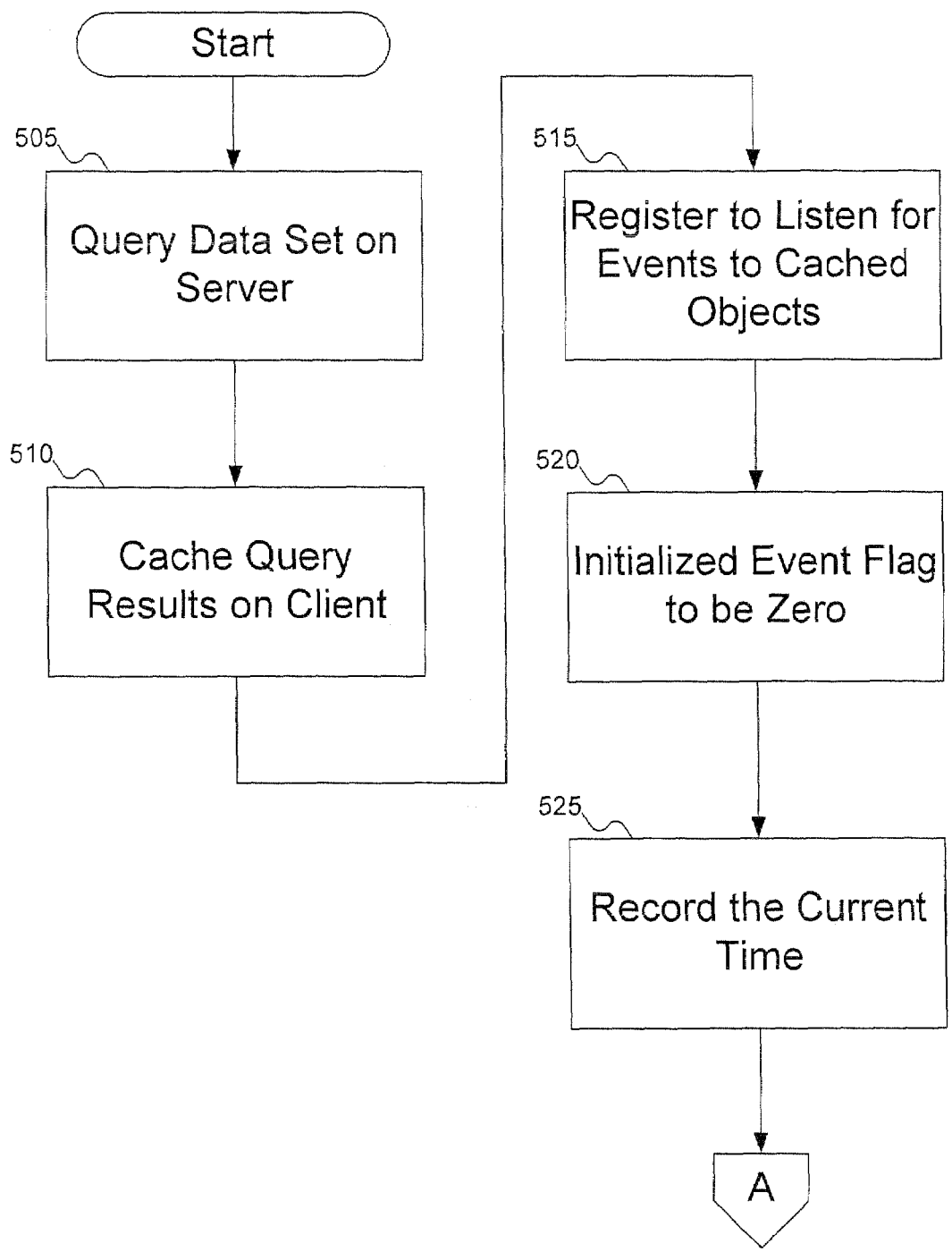
FIGS. 5A-5C show a detailed flowchart to implement the cache update with gating mechanism, according to an embodiment of the invention.
Figure 5B:
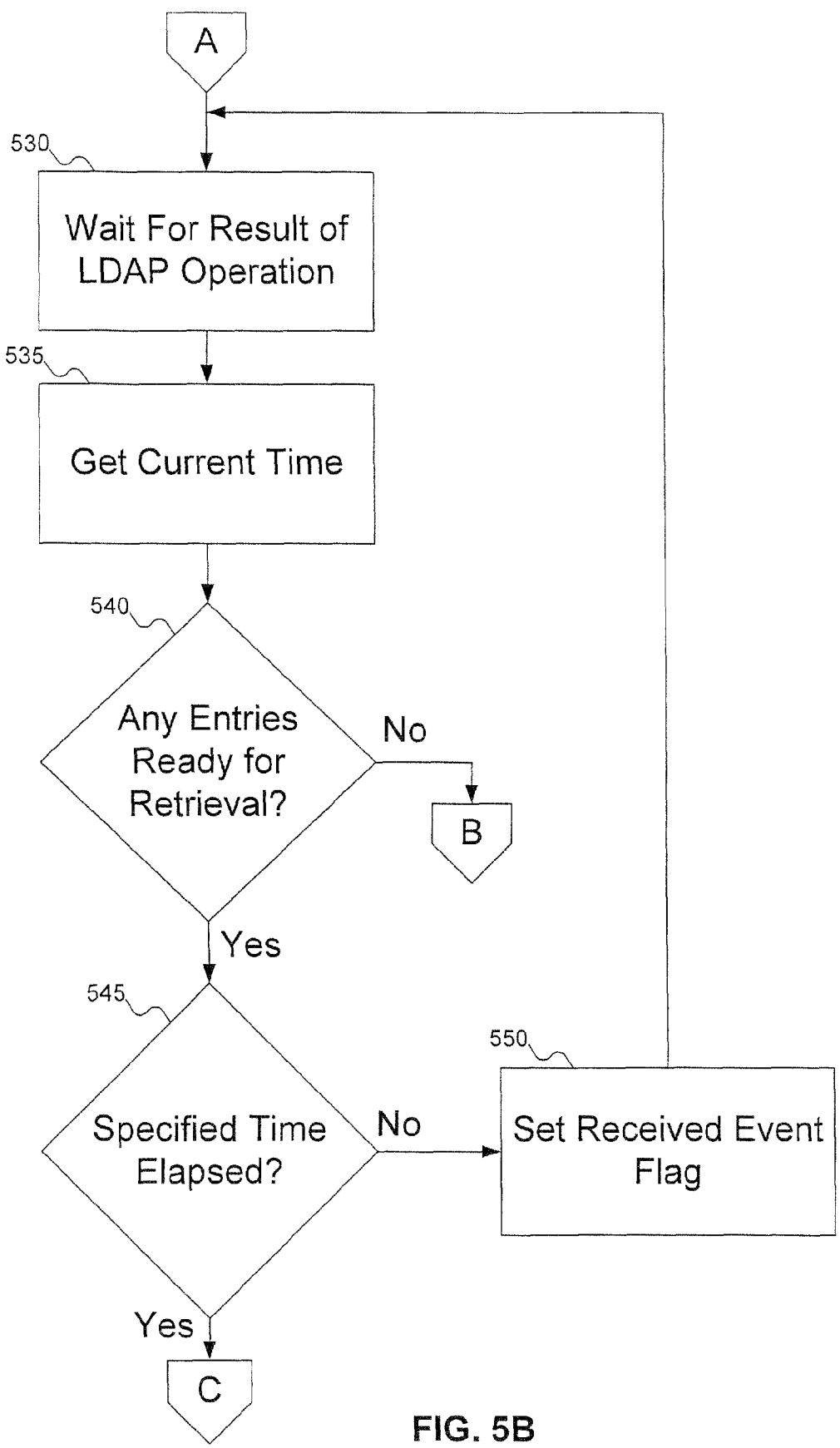
Figure 5C:
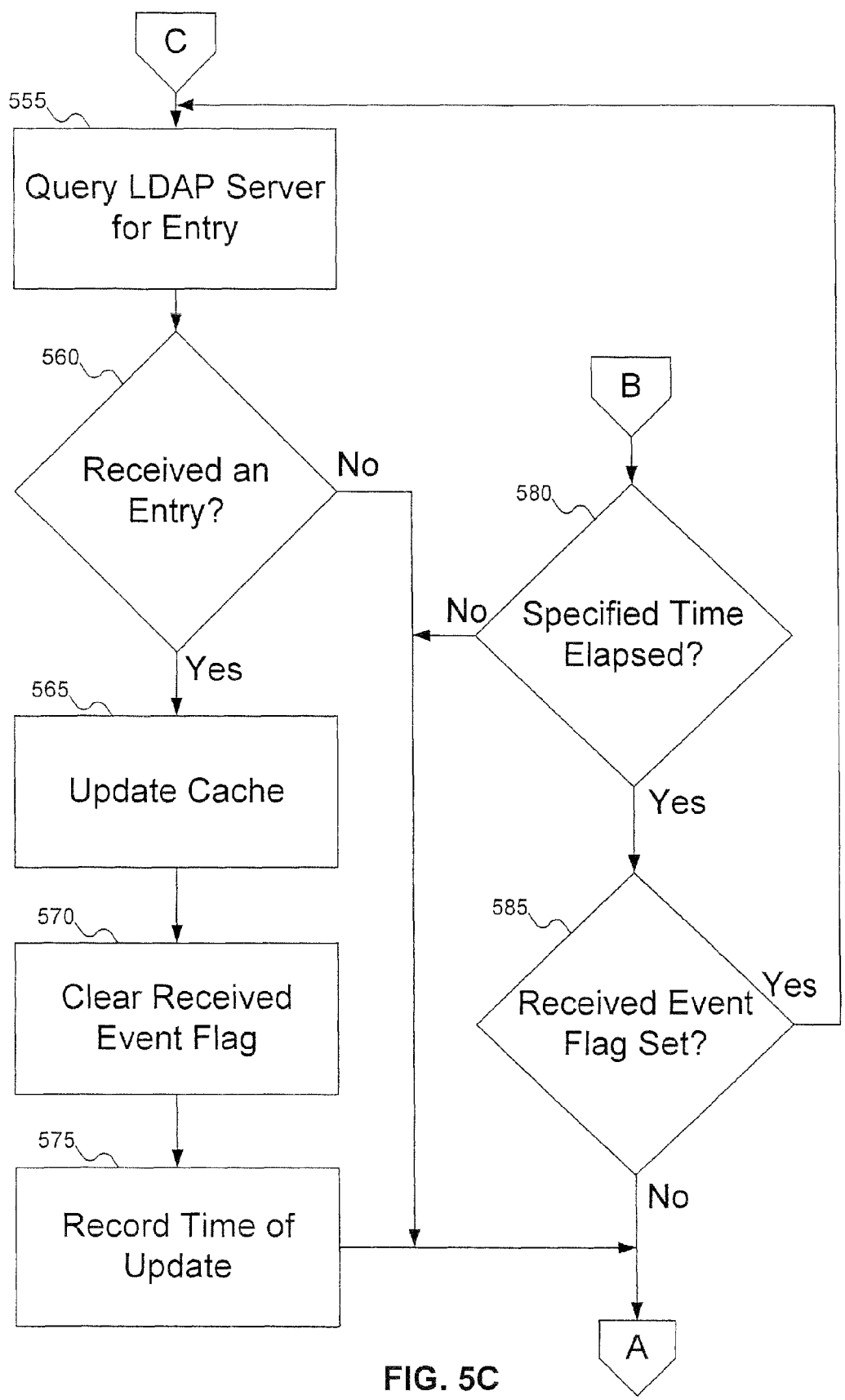

FIGS. 5A-5C show a detailed flowchart of the process used to initialize the cache and update the cache using a gating mechanism, according to an embodiment of the invention. FIG. 5A shows the steps that are performed as an object is initially cached on the LDAP client. These steps are performed at the beginning when an object is first cached. Note that these steps can be performed on a single object at a time, or if there is more than one object being accessed, each of the objects can be cached and registered together. Although FIG. 5A only shows these steps occurring one time, in practice different objects from the LDAP server can be referenced at different times, and these objects will similarly be initialized according to the steps shown in FIG. 5A at those different times. Once an object has been stored in the local cache, then the gating mechanism can be used in order to update the object in the cache as the cached object is modified on the LDAP server.

At step 505, the LDAP client queries the data set on the LDAP server. At step 510, the LDAP client caches the results on the LDAP client at step 510. At step 515, the LDAP client registers with the persistent search module to receive notification of events occurring to the locally cached object. At step 520, an event flag is initialized to be zero, indicating that there have been no events that have changed the cached object. Note that as time passes, and changes occur to registered object, this flag can then be set so that the changes can be updated in the cache at the appropriate time. This is described further below with reference to FIG. 5C. At step 525, the current time is recorded, indicating when the initial cache of the object occurred.

After the initialization steps shown on FIG. 5A, the process enters a cycle of waiting for events and time to elapse, as shown in FIGS. 5B and 5C. This cycle begins at identifier A, shown on FIG. 5B. At step 530, the LDAP client waits to receive notification of an event to a registered object. This notification can occur when an object is modified or queried. The notification can also occur after a specified time interval has elapsed, without an event occurring to the object. For example, by supplying a time out parameter to the LDAP operation, the LDAP operation returns when the time out time is reached or when an event occurs to an object in the data set.

After receiving a result from the LDAP operation, at step 535 the current time is obtained and compared to the time of the last update. The current time is used to determine if a specified time interval has elapsed since the last cache update to an object in the cache. At decision block 540, the result of the LDAP operation is checked to see if an entry is available for retrieval from the LDAP server. If an entry is available for retrieval, then at decision block 545, the time is compared to determine if the specified time has elapsed. If the specified time has not elapsed, then at then at step 550 the received event flag is set, and the cycle begins again at step 530, without updating the cache. Note that step 550 illustrates how the gating is used to determine when the cache should be updated rather than updating the cache every time a change occurs to a cached entry. When the received event flag is set, and the specified time interval has elapsed, then any cached object that has been modified on the LDAP server can be updated in the cache.

If at decision block 545, the specified time has elapsed, then the cache can be updated as shown at identifier C on FIG. 5C. At step 555, the LDAP server is queried to obtain the entry. At decision block 560, if the query did not result in an entry being returned, the cycle returns to identifier A and waits for the receipt of another result of an LDAP operation at step 530. If the query does return an entry, then at step 565 the cache is updated with the new entry. At step 570, the received event flag is cleared, and at step 575, the time the update occurred at step 530 is recorded. The process then returns to identifier A on FIG. 5B to wait for another result at step 530.

Returning to identifier A, suppose the received event flag is set. This indicates that an entry to be updated has been gated until the specified time interval has elapsed. At step 530 a result for the LDAP operation is received. As previously discussed, this result can be because the operation timed out, or because of an event to an object in the data set The time is obtained at step 535. Suppose that at step 540, no entries are available for retrieval, then the process will continue at identifier B on FIG. 5C. In an embodiment of the invention, there might not be entries available for retrieval if the operation timed out before an event occurred to the objects in the data set. At decision block 580, it is determined if the specified time has elapsed. If the specified time has elapsed, then at step 585, the received event flag is checked. If the received event flag is set, then the process continues at step 555 where the steps to update the cache are performed.

If, at decision block 585, the received event flag is not set, this means that while the specified time interval has elapsed, there have been no modifications to the cached object that require updating in the cache. By using the gating mechanism with a timekeeper, the load is reduced to query the LDAP server only when there are known modifications that require updating, and only in a time interval. This manages to strike a balance between the maintaining an accurate cache of objects while not causing too much load on the server.

In the description of FIGS. 5A-5C, reference was made to gating and updating a single cached object. In another embodiment of the invention, the cache can store multiple objects. Then, as modifications occur to the objects stored in the local cache, the objects can be gated and updated as a group, rather than individually as shown in FIG. 5A-5C.

Appendix A shows a fragment of code that illustrates an embodiment of the invention. The code in Appendix A snows just one embodiment, and does not represent all embodiments of the invention. The code in Appendix A is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

APPENDIX A

The following fragment of code illustrates an embodiment of the invention:

```
while ( cur_signal == 0 )
{
  result = NULL;
  rc = ldap_result( ld,
```

APPENDIX A-continued

```
    msgid,
    LDAP_MSG_ONE
    &timeOut,
    &result );
if (gettimeofday(&tv, NULL))
{
  syslog(LOG_ERR,"%s unable to get system time: %s",
CACHE_DAEMON_NAME, sys_errlist[errno]);
  if ( result != NULL ) ldap_msgfree( result );
  return 1;
}
switch ( rc )
{
    .
    .
    .
    case 0:              /* No entries are ready for retrieval. */
      if ( result != NULL )ldap_msgfree( result );
      pthread_mutex_lock(&refresh_time_mutex);
      timeDiff = tv.tv_sec – last_refresh_time.tv_sec;
      pthread_mutex_unlock(&refresh_time_mutex);
      //
      // Make sure we do update on last entry.
      // Do we have entry to update ?
      //
      if ( (timeDiff > TIME_TO_WAIT) && (flag == 1) )
      {
        alarm(1);           /* Trigger cache update */
        sem_wait(&ldapWatcher);
        flag = 0;
      }
      break;
    case LDAP_RES_SEARCH_ENTRY:   /* An entry is ready
for retrieval */
      if ( ( entry = ldap_first_entry( ld, result )) == NULL )
      { /* didn't get an entry, loop again */
        if ( result != NULL )ldap_msgfree( result );
        continue;
      }
      .
      .
      .
      pthread_mutex_lock(&refresh_time_mutex);
      timeDiff = tv.tv_sec – last_refresh_time.tv_sec;
      pthread_mutex_unlock(&refresh_time_mutex);
      if (timeDiff < TIME_TO_WAIT)
      {
        flag = 1;
        break;
      }
      alarm(1);           /* Trigger cache update */
      sem_wait(&ldapWatcher);
      flag = 0;
      break;
    .
    .
    .
} /* end switch */
} /* end of the loop */
```

The invention claimed is:

1. A computer-implemented method for updating a local cache of information stored on a server, comprising:
  querying a data set on the server, the data set including at least one data object;
  caching the results of the query in a cache on a client computer, wherein the cache includes at least one local object corresponding to the at least one data object;
  registering with a persistent search module on the server to listen for events notifying a gating module on the client computer when the data object changes;
  specifying a time interval before cached objects are updated;
  receiving an event from the persistent search module indicating a change to the data object;

determining if the specified time interval has elapsed since the caching of the results responsive to receiving the event; and updating the cache if the specified time interval has elapsed and the event was received indicating the change to the data object; and delaying updating the cache if the specified time interval has not elapsed and the event was received indicating the change to the data object.

2. A method according to claim 1, wherein updating the cache if the specified time interval has elapsed includes updating the local object.

3. A method according to claim 1, wherein updating the cache if the specified time interval has elapsed includes querying the data set on the server.

4. A method according to claim 1, further comprising waiting for a second event without updating the cache if the specified time interval has not elapsed.

5. A method according to claim 4, further comprising:
receiving a second event; and
determining if the specified time interval has elapsed since the caching of the results responsive to receiving the second event.

6. A method according to claim 1, wherein querying a data set on the server includes querying a data set implemented according to a lightweight directory access protocol (LDAP).

7. An article, comprising a storage medium, said storage medium having stored thereon instructions, that, when executed by a machine, result in:
querying a data set on a server, the data set including at least one data object;
caching the results of the query in a cache on a client computer, wherein the cache includes at least one local object corresponding to the at least one data object;
registering with a persistent search module on the server to listen for events notifying a gating module on the client computer when the data object changes;
specifying a time interval before cached objects are updated;
receiving an event indicating a change to the data object;
determining if the specified time interval has elapsed since the caching of the results responsive to receiving the event; and
updating the cache if the specified time interval has elapsed and the event was received indicating the change to the data object; and
delaying updating the cache if the specified time interval has not elapsed and the event was received indicating the change to the data object.

8. An article according to claim 7, wherein updating the cache if the specified time interval has elapsed includes updating the local object.

9. An article according to claim 7, wherein updating the cache if the specified time interval has elapsed includes querying the data set on the server.

10. An article according to claim 7, further comprising waiting for a second event without updating the cache if the specified time interval has not elapsed.

11. An article according to claim 10, further comprising:
receiving a second event; and
determining if the specified time interval has elapsed since the caching of the results responsive to receiving the second event.

12. A article according to claim 7, wherein querying a data set on the server includes querying a data set implemented according to a lightweight directory access protocol (LDAP).

13. A method according to claim 1, wherein caching the results of the query includes caching an object label and an object value for the local object.

14. A method according to claim 1, wherein caching the results of the query includes caching a timestamp indicating when the local object was last updated.

15. A method for updating a local cache of information stored on a server, comprising:
querying a data set on the server, the data set including at least one data object;
caching the results of the query in a cache on a client computer, wherein the cache includes at least one local object corresponding to the at least one data object;
registering with a persistent search module on the server to listen for events related to the data object;
receiving an event from the persistent search module at a gating module on the client, the event indicating a change to the data object;
determining a comparison result responsive to receiving the event, including comparing a specified time interval to a timestamp identifying when the local object was last updated;
updating the cache if the determining indicates the specified time interval has elapsed since the local object was last updated; and
setting a flag associated with the local object if the determining indicates the specified time interval has not elapsed since the local object was last updated, the flag indicating that the data object has changed and that the local object has not been updated.

16. A method according to claim 15, further comprising:
receiving a second event from the persistent search module indicating a second change to the data object; and
updating the local object responsive to receiving the second event if the specified time interval has elapsed since the local object was last updated.

17. A method according to claim 15, wherein the results of the query comprise a plurality of data objects and the cache includes a plurality of local objects corresponding to the plurality of data object and further comprising:
receiving a second event from the persistent search module indicating a change to at least one of the plurality of data objects; and
updating each of the plurality of local objects for which an associated flag has been set if the specified time interval has elapsed since the plurality of local objects were last updated.

* * * * *

UNITED STATES PATENT AND TRADEMARK OFFICE
CERTIFICATE OF CORRECTION

PATENT NO. : 8,694,471 B2  
APPLICATION NO. : 11/463493  
DATED : April 8, 2014  
INVENTOR(S) : Alexander Y. Danoyan Page 1 of 1

It is certified that error appears in the above-identified patent and that said Letters Patent is hereby corrected as shown below:

In the specification

In column 2, line 43, replace "servers" with -- server, --;
In column 6, line 47, replace "snows" with -- shows --.

Signed and Sealed this
Ninth Day of August, 2016

Michelle K. Lee
*Director of the United States Patent and Trademark Office*